(12) United States Patent
Lin

(10) Patent No.: US 8,094,882 B2
(45) Date of Patent: Jan. 10, 2012

(54) IMAGE DISPLAY METHOD AND SYSTEM THEREOF

(75) Inventor: Yu-Chia Lin, Taipei (TW)

(73) Assignee: Tatung Company, Taipei (TW)

( * ) Notice: Subject to any disclaimer, the term of this patent is extended or adjusted under 35 U.S.C. 154(b) by 964 days.

(21) Appl. No.: 12/076,469

(22) Filed: Mar. 19, 2008

(65) Prior Publication Data
US 2008/0304713 A1    Dec. 11, 2008

(30) Foreign Application Priority Data
Jun. 8, 2007    (TW) ................................ 96120871 A

(51) Int. Cl.
*G06K 9/00*    (2006.01)

(52) U.S. Cl. .......................................... 382/103; 725/82

(58) Field of Classification Search .................. 382/103; 705/25; 725/82
See application file for complete search history.

(56) References Cited

U.S. PATENT DOCUMENTS

| | | | |
|---|---|---|---|
| 2003/0009392 A1* | 1/2003 | Perkowski | ...................... 705/26 |
| 2004/0158865 A1* | 8/2004 | Kubler et al. | .................. 725/82 |
| 2005/0078854 A1* | 4/2005 | Shikano et al. | ............... 382/103 |
| 2006/0122909 A1* | 6/2006 | Toshikage et al. | ............. 705/26 |

* cited by examiner

*Primary Examiner* — Hadi Akhavannik
(74) *Attorney, Agent, or Firm* — Bacon & Thomas, PLLC

(57) ABSTRACT

The present invention relates to an image display method and system thereof. When displaying an image, a picture is captured. A calculated number of human eyes is determined from the picture to quantify the attraction of the image for the crowd. And then, a reasonable charged fee is calculated.

11 Claims, 5 Drawing Sheets

| time point | image | minimum number of human eyes | calculated number of human eyes |
|---|---|---|---|
| $t_1$ | $C_1$ | 0 | 0 |
| $t_2$ | $C_1$ | 0 | 1 |
| $t_3$ | $C_1$ | 1 | 10 |
| $t_4$ | $C_1$ | 10 | 2 |
| $t_5$ | $C_2$ | 10 | 5 |
| $t_6$ | $C_3$ | 10 | 7 |
| $t_7$ | $C_4$ | 10 | 3 |
| $t_8$ | $C_5$ | 10 | 9 |
| $t_9$ | $C_5$ | 9 | 6 |

Fig. 3

| image | display period length | calculated number of human eyes | charged fee |
|---|---|---|---|
| $C_1$ | $S_1$ | $E_1$ | $f(S_1, E_1)$ |
| $C_2$ | $S_2$ | $E_2$ | $f(S_2, E_2)$ |
| $C_3$ | $S_3$ | $E_3$ | $f(S_3, E_3)$ |
| $C_4$ | $S_4$ | $E_4$ | $f(S_4, E_4)$ |
| $C_5$ | $S_5$ | $E_5$ | $f(S_5, E_5)$ |

Fig. 4

IMAGE DISPLAY METHOD AND SYSTEM THEREOF

BACKGROUND OF THE INVENTION

1. Field of the Invention

The invention relates to an image display method and system thereof, and more particularly to an image display method and system thereof for displaying advertise images.

2. Description of Related Art

Recently, the electrical advertising panel is essential to the advertising media in the urban region with a crowd of people. Because the electrical advertising panel is located at the intersection of main roads crossed over by lots of people, the electrical advertising panel has better advertising benefit.

Therefore, the image display method of the conventional electrical advertising panel is to display advertising images in a period equivalent to the advertising purchaser purchased the display time interval, and the conventional electrical advertising panel arranges a plurality of advertisement video in an order of display sequence. The conventional displaying method can not display the advertising images for achieving the preference of the people walked on the road on time, and therefore the advertising purchasers can not calculate a reasonable charged fee for the advertising image count on the substantial advertising benefit during displaying period.

SUMMARY OF THE INVENTION

An object of the present invention is to provide an image display method and system thereof to display fascinating image for complying the preference of a crowd of people.

The other object of the present invention is to provide an image display method and system thereof for calculating a reasonable charged fee of the displayed image.

For achieving the aforementioned objects, this present invention provides an image display method, comprising: (A) initializing a minimum number of the human eyes; (B) selecting one image from a plurality of images; (C) displaying the selected image; (D) capturing a picture located near to the selected image displayed position for identifying the human eyes so as to calculate a calculated number of the human eyes; (E) comparing the calculated number of the human eyes to the minimum number of human eyes; (F) if the calculated number of the human eyes is smaller than the minimum number of human eyes to exceed a threshold limit value, selecting another image randomly and repeating step (C); and (G) if the calculated number of the human eyes is not smaller than the minimum number of human eyes to exceed a threshold limit value, setting the minimum number of the human eyes as the calculated number of human eyes and repeating step (C).

For achieving the aforementioned objects, this present invention provides an image display system, comprising: a storage unit saving a plurality of images; a display unit displaying an image; an image inputting device capturing at least one picture located near to the display unit; and a control unit electrically connected to the storage unit, the display unit and the image inputting unit for controlling the storage unit, the display unit and the image inputting unit; wherein, the control unit initials the minimum number of the human eyes, selects and displays one of the plurality of images, identifies the human eyes in the captured picture for calculating a calculated number of the human eyes for determining whether the calculated number of the human eyes is smaller than the minimum number of the human eyes to exceed a threshold limit value or not; if true, selecting another image to display randomly; if not true, setting the minimum number of the human eyes as the calculated number of human eyes and repeating to display the image.

During displaying period of the aforementioned image, the control unit controls an image inputting device to capture the image of real statement so as to display on the display unit such as the picture showed a crowd of people located near to the display unit, and the image inputting device is preferably a camera device. The calculated number of human eyes is calculated by an eye identifying system capable of identifying the number of human eyes displayed on the picture captured by the camera device preferably. Therefore, the calculated number of human eyes is used to determine that whether the image displayed on the display unit attracts the people or not.

While the calculated number of human eyes smaller than a minimum number of human eyes to exceed a threshold limit value, it means that the present displayed image cannot attract people, and therefore the control unit will control the display unit to display another image after displaying the image. The threshold limit value is determined by the user or the manufacture of the display system as a reference value for determining the image can attract the crowd of people or not. While the calculated number of human eyes is not smaller the minimum number of human eyes to exceed the threshold limit value, or even larger than the minimum number of human eyes, it means that the present displayed image is used to hold a special attraction for crowd of people, and therefore the control unit will control the display unit to display this image continuously after finishing displaying the image, and set the minimum number of the human eyes as a calculated number of human eyes preferably. While changing the displayed image, one image will be selected from all or part of images randomly or in a predetermined sequence according to the users demanding.

The storage unit can save a plurality of charged fees corresponding to each of images, and each of the aforementioned charged fees can be determined by proportion to the display times, display period length, and/or the number of human eyes so as to calculate a reasonable charged fee according to the watching times, period length, and/or the number of watching persons.

Therefore, this present invention can capture a picture during displaying period of the image located near to the image display system for identifying the number of human eyes in the picture to determine whether the image is attractive to a crowd of people or not so as to calculate a reasonable charged fee.

Other objects, advantages, and novel features of the invention will become more apparent from the following detailed description when taken in conjunction with the accompanying drawings.

BRIEF DESCRIPTION OF THE DRAWINGS

FIG. 3 shows schematic view of the image display method of preferred embodiment of this present invention.

FIG. 4 shows a schematic view for calculating method of reasonable charged fees of the preferred embodiment.

DETAILED DESCRIPTION OF THE PREFERRED EMBODIMENT

Figure 1:
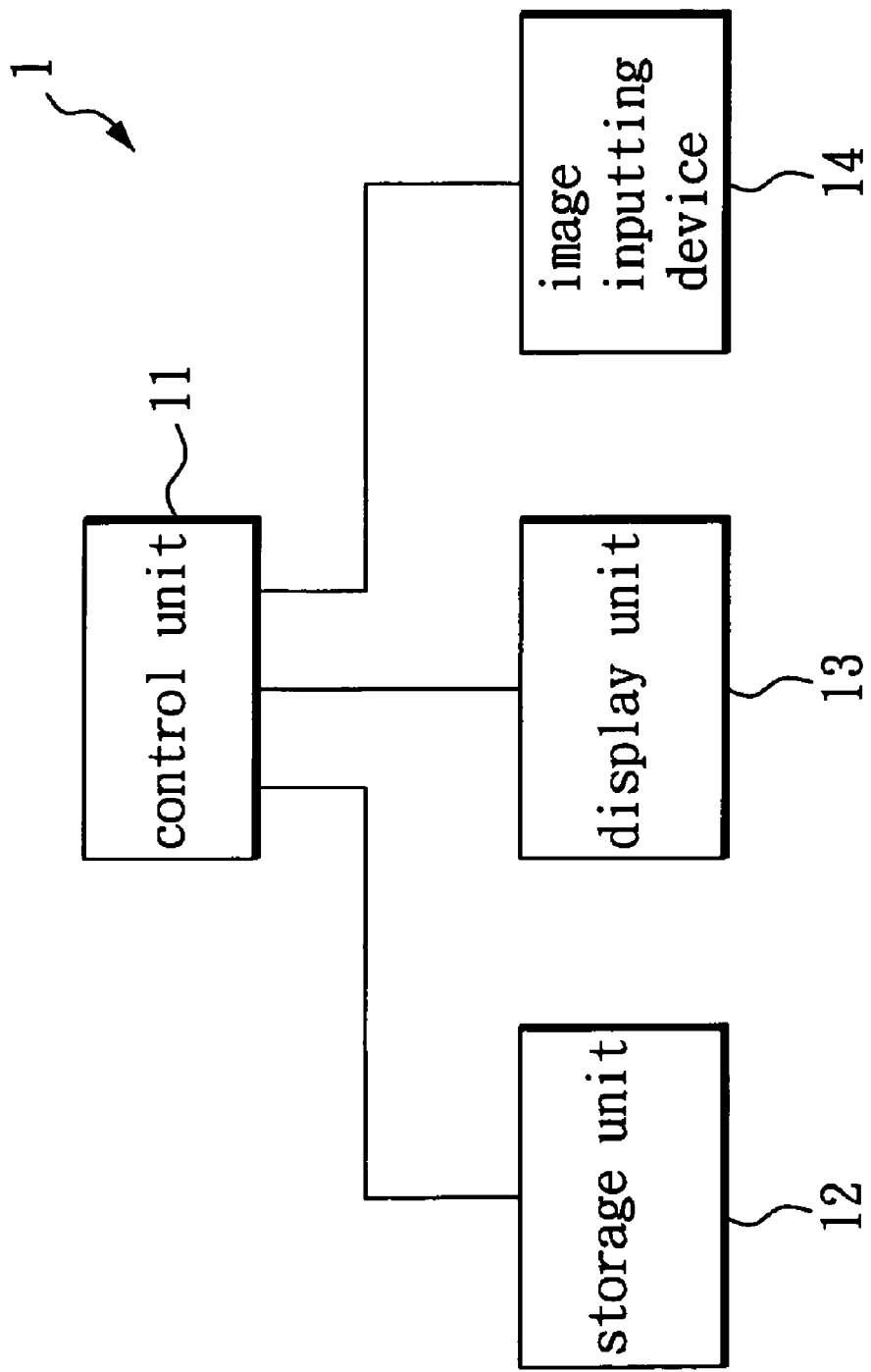
FIG. 1 shows a schematic view of the image display system of the preferred embodiment according to this present invention.

FIG. 1 shows a schematic view of the image display system of the preferred embodiment according to this present invention. Referring to FIG. 1, the image display system 1 comprises a control unit 11, a storage unit 12, a display unit 13, and an image inputting unit 14. The control unit electrically connects to the storage unit 12, the display unit 13, and the image inputting unit 14 respectively. The storage unit 12 saves a plurality of images such the images C1, C2, C3, C4, and C5 of this embodiment.

Figure 2:
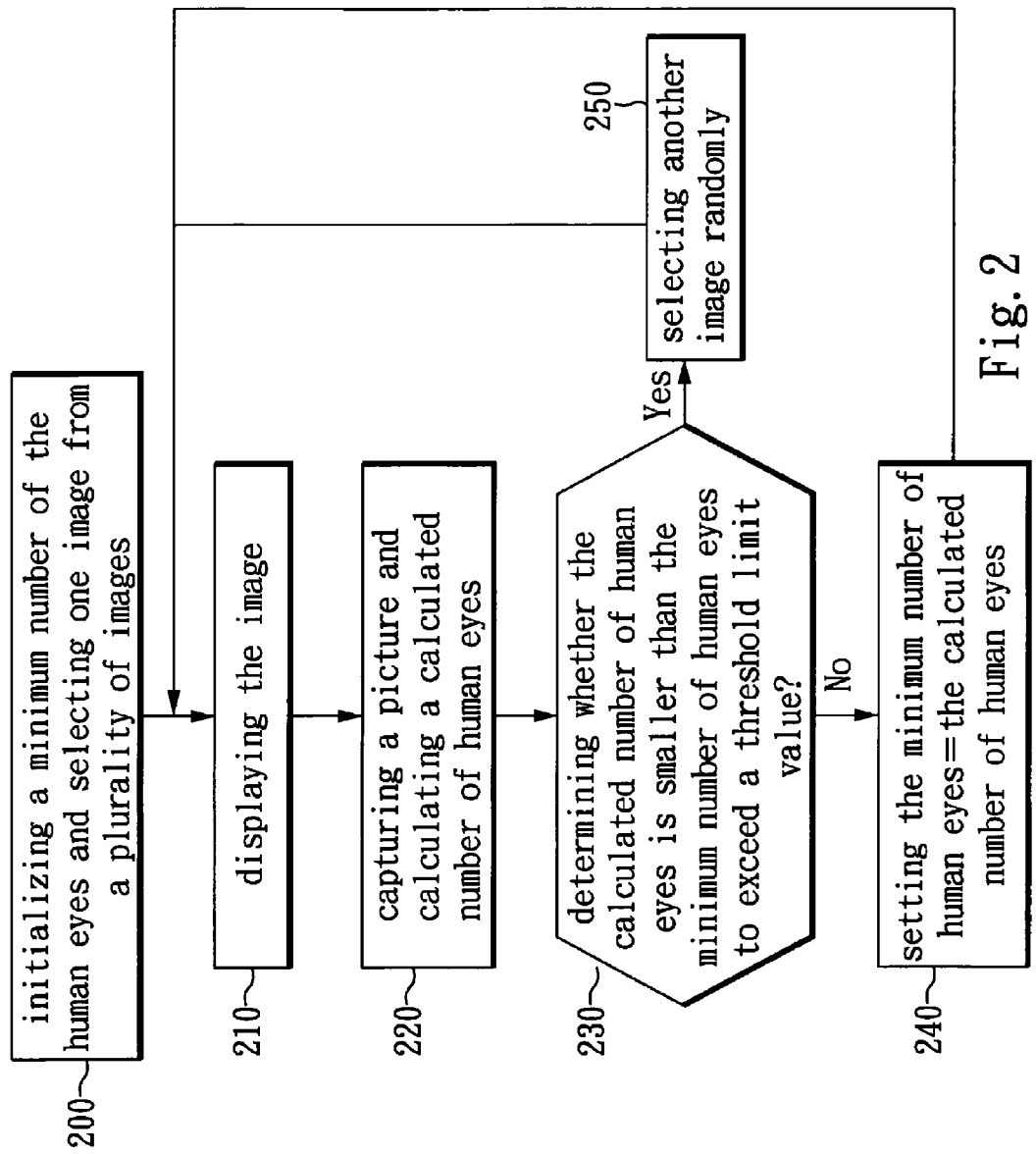
FIG. 2 shows a flow chart of image display method of the preferred embodiment of this present invention.

Please refer to both FIG. 2, and FIG. 3. FIG. 2 shows a flow chart of image display method of the preferred embodiment of this present invention. FIG. 3 shows schematic view of the image display method of preferred embodiment of this present invention. At the time point t1, the control unit 11 initials an minimum number of human eyes as 0 and sets a threshold limit value as 2. The control unit 11 randomly selects an image C1 as the image to be displayed (step 200). The control unit 11 then displays the image C1 on the display unit 13 (step 210). During the displaying period of image C1, the control unit 11 controls the image inputting device 14 to capture a picture for identifying the number of human eyes showed on the picture so as to calculate a calculated number of human eyes (step 220). In this present embodiment, the image inputting device 14 is a camera device located near to the display unit 13, where the image C1 is displayed, so as to capture the real time status of crowd of people. After that, the control unit 11 compares the calculated number of human eyes with the minimum number of human eyes for determining whether the calculated number of human eyes is small than the minimum number of human eyes to exceed a threshold limit value (step 230). For illustrating clearly, the calculated number of human eyes is assumed to be 0 in this embodiment so that the calculated number of human eyes is not smaller than the minimum number of human eyes. Therefore, when the image C1 is displayed totally, the control unit 11 will control the display unit 13 to display the image C1 continuously at the time point t2 and set the calculated number of human eyes as equal to the minimum number of human eyes (step 240).

During displaying the image C1 at time point t2, the control unit 11 controls the image inputting device 14 to capture another picture showing the real time status of the crowd near the display unit 13 for calculating a new calculated number of human eyes such as 1. Then, the control unit 11 compares the new calculated number of human eyes with the minimum number of human eyes so that the new calculated number of human eyes is larger than the minimum number of human eyes. At this time, the control unit 11 will set the minimum number of human eyes as equal to the present calculated number of human eyes and continuously display the image C1 at the next time point t3 after finishing displaying the image C1.

At time point t3, it is assumed that the control unit 11 identifies ten pairs of human eyes on a picture captured at this time, and therefore the control unit 11 will set the minimum number of human eyes as equal to the calculated number of the human eyes, i.e. 10, and continuously display the image C1 at next time point t4 after finishing displaying the image C1.

At time point t4, it is assumed that the control unit 11 calculates the calculated number of human eyes as 2 according to the captured picture showing the crowd at this time. While comparing the calculated number of human eyes to the minimum number of human eyes, it is determined that the calculated number of human eyes is smaller than the minimum number of human eyes to exceed the threshold limit value, 2. Therefore, it is determined that the image to be displayed at next time point t5 will be changed (step 250).

At time point t5, the control unit 11 will randomly select an image never displayed on the display unit 13 such as C2 for displaying on the display unit 13, and capture a picture of crowd of people for calculating the calculated number of human eyes, such as 5 during displaying image C2. Comparing the calculated number of human eyes to the minimum number of human eyes at this time, while calculated number of human eyes is still smaller than the minimum number of human eyes to exceed the threshold limit value, the control unit 11 determines that the image to be displayed at next time point t6 will be changed.

At time point t6, the control unit 11 display image C3 and calculates the calculated number of human eyes, such as 7, which is still smaller than the minimum number of human eyes. Therefore, the control unit 11 determines that the image to be displayed at next time point t7 will be changed to image C4.

At time point t7, the control unit 11 displays the image C3 and calculated the calculated number of human eyes, such as 3. Namely, the control unit 11 still determines that the image to be displayed at next time point t8 will be changed to the image C4.

At time point t8, the control unit 11 calculates the calculated number of human eyes while displaying the image C5 is assumed to be 9. Because the calculated number of human eyes is not smaller than the minimum number of human eyes to exceed the threshold limit value, the image C5 will be displayed at next time point t9 continuously.

At time point t9, the calculated number of human eyes of while displaying image C5 is fail to be greater than the minimum number of human eyes, and therefore the control unit 11 will finish displaying after time point t9.

Therefore, in this embodiment, the control unit 11 can determine the calculated number of human eyes on the picture while displaying for comparing to the minimum number of human eyes. If the calculated number of human eyes is smaller than the minimum number of human eyes to exceed a threshold limit value, the image display system will display another image after displaying present image for displaying attracting images depends on the preference of a crowd of people timely to perform better advertising effect.

FIG. 4 shows a schematic view for a calculating method of reasonable charged fees of the preferred embodiment according to the present invention. Refer to FIG. 4, the image display system provides five images C1, C2, C3, C4, and C5. The formula of the calculation method relates to the display times, display period length, such as display seconds, and the calculated number of human eyes while each time displaying images C1, C2, C3, C4 and C5 respectively. After displaying any one image of the five images C1, C2, C3, C4 and C5, the charged fees of the displayed image will be calculated and saved at the memory unit of the image display system.

Figure 5:
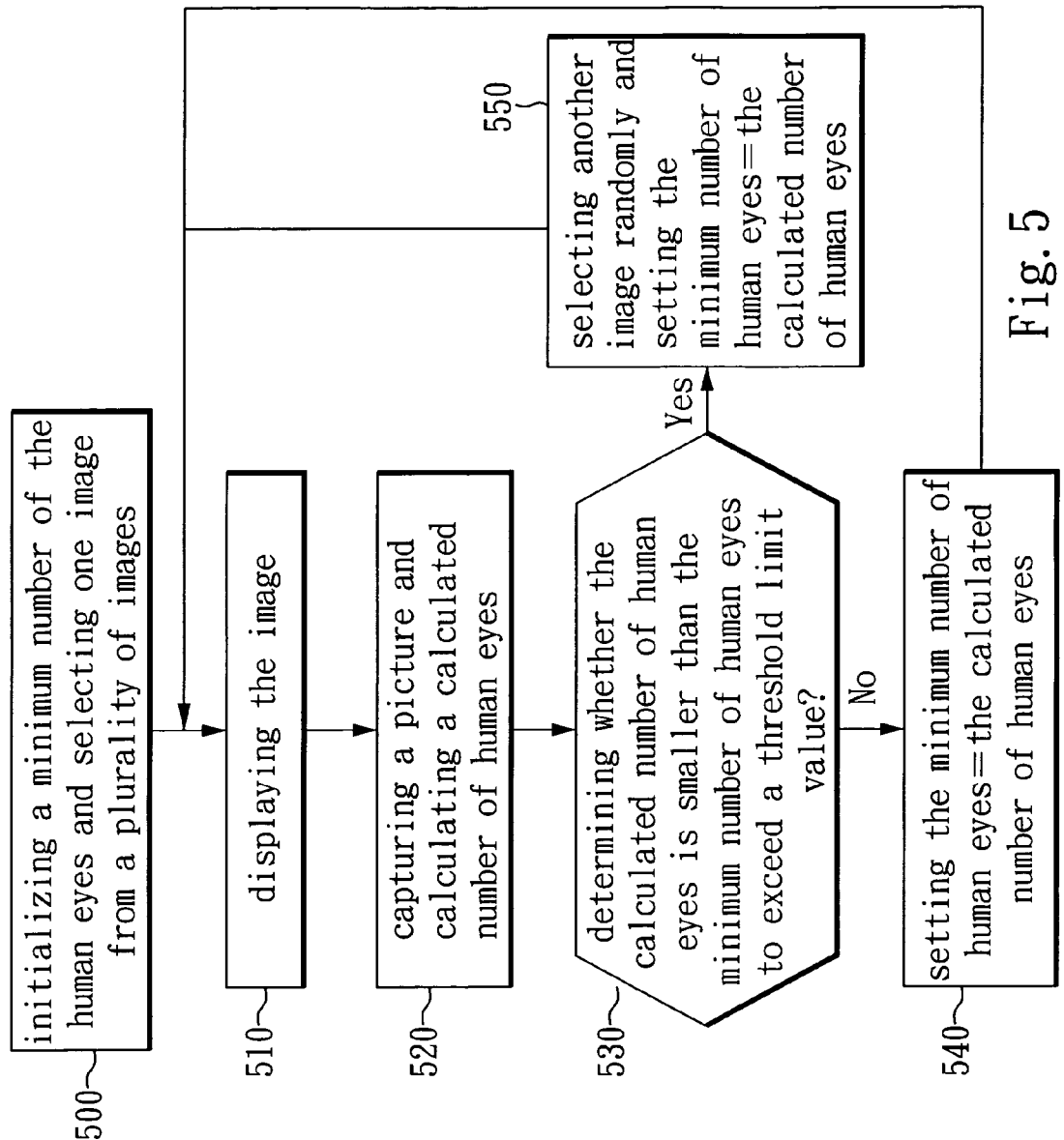
FIG. 5 shows a flow chart of controlling procedure of image display method of another embodiment.

However, another embodiment of this present invention illustrates a controlling procedure of image display method, shown in FIG. 5, and the difference between the two embodiments will be described thereinafter. Referring to FIG. 5, while the calculated number of human eyes is smaller than the minimum number of human eyes to exceed a threshold limit value, in the present embodiment, the image to be displayed will be changed for another image also. However, at this time, the control unit 11 will set the minimum number of human eyes as equal to the present calculated number of human eyes for comparing with another calculated number of human eyes calculated at next time point.

Therefore, according to the above statement, this present invention can calculate a calculated number of human eyes from the picture captured while displaying image for determining numerically the image is popular for crowd of people or not. If the calculated numbers is smaller than a minimum number of human eyes to exceed a threshold limit value, the image display system will change the displayed image so as to fit the preference of the crowd of people timely so as to calculate a reasonable charged fees according to the number of watching people and the display period length.

Although the present invention has been explained in relation to its preferred embodiment, it is to be understood that many other possible modifications and variations can be made without departing from the scope of the invention as hereinafter claimed.

What is claimed is:

1. An image display method, comprising:
   (A) initializing a minimum number of the human eyes;
   (B) selecting one image from a plurality of images arranged for an electrical advertising panel;
   (C) displaying the selected image;
   (D) capturing a picture located near to the selected image displayed position for identifying the human eyes so as to calculate a calculated number of the human eyes;
   (E) comparing the calculated number of the human eyes to the minimum number of human eyes;
   (F) if the calculated number of the human eyes is smaller than the minimum number of human eyes to exceed a threshold limit value, selecting another image randomly and repeating step (C);
   (G) if the calculated number of the human eyes is not smaller than the minimum number of human eyes to exceed a threshold limit value, setting the minimum number of the human eyes as the calculated number of human eyes and repeating step (C); and
   (H) calculating a charged fee for displaying the image according to display times, display period length, and the calculated number of human eyes for each image.

2. The method as claimed in claim 1, wherein the picture is captured by an image inputting device.

3. The method as claimed in claim 2, wherein the image inputting device is a camera device.

4. The method as claimed in claim 1, wherein the charged fee relates to the calculated number of the human eyes.

5. The method as claimed in claim 1, wherein the charged fee relates to the display times of the image.

6. The method as claimed in claim 1, wherein the charged fee relates to the displaying period length of the image.

7. The method as claimed as claim 1, wherein in the step (F), while selecting another image to display randomly, the minimum number of the human eyes is set equal to the calculated number of the human eyes.

8. An image display system, comprising:
   a storage unit saving a plurality of images arranged for an electrical advertising panel;
   a display unit displaying an image;
   an image inputting device capturing at least one picture located near to the display unit; and
   a control unit electrically connected to the storage unit, the display unit and the image inputting unit for controlling the storage unit, the display unit and the image inputting unit;
   wherein, the control unit initials the minimum number of the human eyes, selects and displays one of the plurality of images, identifies the human eyes in the captured picture for calculating a calculated number of the human eyes for determining whether the calculated number of the human eyes is smaller than the minimum number of the human eyes to exceed a threshold limit value or not; if true, selecting another image to display randomly; if not true, setting the minimum number of the human eyes as the calculated number of human eyes and repeating to display the image, and wherein the control unit calculates a charged fee according to display times, display period length, and the calculated number of human eyes for each image and stores the charged fees of the images in the storage unit.

9. The image display system as claimed in claim 8, wherein the image inputting device is a camera device.

10. The image display system as claimed in claim 8, wherein the control unit calculates a charged fee of the image according to the calculated number of human eyes.

11. The image display system as claimed in claim 8, wherein when the calculated number of the human eyes is smaller than the minimum number of the human eyes to exceed a threshold limit value and the control unit selects another image, the control unit also sets the minimum number of the human eyes equal to the calculated number of the human eyes.

* * * * *